United States Patent
Jiang et al.

(10) Patent No.: US 7,339,626 B2
(45) Date of Patent: Mar. 4, 2008

(54) DEINTERLACING VIDEO IMAGES WITH SLOPE DETECTION

(75) Inventors: Hong Jiang, Warren, NJ (US); Kim N. Matthews, Watchung, NJ (US); Lesley Jen-Yuan Wu, Parsippany, NJ (US); Xiaoyun Wu, Shanghai (CN)

(73) Assignee: Lucent Technologies Inc., Murray Hill, NJ (US)

( * ) Notice: Subject to any disclaimer, the term of this patent is extended or adjusted under 35 U.S.C. 154(b) by 661 days.

(21) Appl. No.: 10/862,215

(22) Filed: Jun. 7, 2004

(65) Prior Publication Data

US 2005/0270417 A1    Dec. 8, 2005

(51) Int. Cl.
*H04N 7/01* (2006.01)
(52) U.S. Cl. .................................... 348/448
(58) Field of Classification Search ............... 348/448, 348/441, 450–452, 458, 459; *H04N 7/01, H04N 11/20*
See application file for complete search history.

(56) References Cited

U.S. PATENT DOCUMENTS

| 6,515,706 B1 * | 2/2003 | Thompson et al. ......... 348/448 |
| 6,829,013 B2 * | 12/2004 | Thompson et al. ......... 348/448 |
| 7,023,487 B1 * | 4/2006 | Adams ....................... 348/448 |
| 7,218,354 B2 * | 5/2007 | Tanaka ....................... 348/448 |

\* cited by examiner

*Primary Examiner*—Sherrie Hsia

(57) ABSTRACT

An apparatus and method for deinterlacing video images with improved slope detection is described. In one exemplary implementation, the apparatus includes an input buffer, a processor, and an output buffer. The input buffer is configured to receive a video stream in an interlaced format. The processor is configured to convert the video stream from the interlaced format to a progressive format. This conversion process includes calculating the slope for a diagonal line of an image at a pixel to-be-interpolated (i.e., at a missing pixel) using a slope protection operation to increase the accuracy of the slope calculation. The output buffer is then configured to transmit the video stream in the progressive format.

22 Claims, 4 Drawing Sheets

Nine Point Median Filter

DEINTERLACING VIDEO IMAGES WITH SLOPE DETECTION

TECHNICAL FIELD

The present invention relates generally to processing video images, and more particularly, to deinterlacing interlaced video images.

BACKGROUND

Video image streams are often recorded, transmitted, and displayed in two different video image formats: an interlaced format (also commonly referred to as the interlaced scan format) and a progressive format (also commonly referred to as the progressive scan format).

In the interlaced format, each video frame, which is a raster array of pixels representing an image, includes an odd field and an even field. The odd field includes pixels located on odd-numbered horizontal scan lines of the frame and the even field includes pixels located on the even numbered horizontal scan lines of the frame. Thus, each field contains approximately half the information content, i.e., pixels, of the complete video frame. When displayed on an interlaced-based display device, such as a conventional television, video images are presented in the form of a rapid sequence of fields, in which odd fields and even fields are displayed consecutively, e.g., a rate of 60 fields per second, for purposes of reconstructing an entire image at 30 frames per second (although various other rates may apply). Even though only half of the image is displayed per field, the rapid sequence of alternating odd and even horizontal scan lines creates the illusion of a full video image.

In the progressive format, a video image is represented entirely in a single frame that includes pixels on all horizontal lines of the full image. When displayed on a progressive-based display device, such as a computer monitor or of High Definition Television (HDTV), video images are presented in the form of progressively scanned frames, e.g., at a rate of 60 frames per second (although various other rates may apply).

Most conventional televisions support only the interlaced format and cannot perform progressive scanning. Accordingly, most video applications associated with display on televisions, including digital video players, such as DVD players, etc. are currently formatted in the interlaced format. As more progressive scan devices are adapted to play video on computers and HDTVs, however, there is a need for such devices to convert video from the interlaced format to progressive format.

The process of converting a video from the interlaced format to the progressive format is generally referred to as deinterlacing (also referred to as line-doubling). There are several ways to perform deinterlacing. Inexpensive devices may use what is known in the industry as the "weave" technique for performing the conversion from the interlaced format to the progressive format. Weaving simply merges even and odd fields together to make one progressive frame. If the video image is still (i.e., there are few or no moving objects in the image and/or objects that are moving are moving slowly), weaving tends to produce an image that is visually precise. However, if an image contains moving objects, particularly fast moving objects, the image produced on the display device tends to contain visual artifacts, such as visual distortions, feathering around the periphery of a moving object, flickering, pixel discontinuities, image inconsistencies, varying vertical resolutions, and other visual distortions. These artifacts tend to make images unsuitable for viewing on a HDTV or other high quality video players. These visual distortions are caused because there may be a time difference between when each odd and even field was recorded, and when they are combined the time differences produce the artifacts.

Another technique used to convert video from interlaced format to the progressive format is known as interpolation (also referred to the "Bob" technique). Interpolation involves converting each independent field into a complete single frame rather than combining even and odd fields to form a frame. But each field in the interlaced format only contains half the even or odd lines of a full resolution picture in the progressive format. To create a full frame, interpolation techniques involve filling-in so-called "missing lines," meaning the even or odd lines that are not a part of the current field. For instance, if there is an even field, interpolation techniques will fill-in the missing lines, i.e., the odd lines, based on the pixel data from the existing, even lines to predict suitable pixel values for the pixels in the lines that are being interpolated, i.e., the missing pixels in the missing lines, and create a progressive frame. Correspondingly, if there is an odd field, interpolation techniques will fill-in the missing lines, i.e., the even lines, based on the existing odd lines to create a progressive frame. More specifically, interpolation techniques will fill-in the even or odd missing lines, depending on the field, by using pixels above and below those missing lines that are to be approximated through mathematical estimations. Unfortunately, these mathematical estimations are educated guesses that often produce artifacts, usually associated with motion and shifts of information in fields. In the world of HDTV, these artifacts are often sufficiently visually noticeable, making the visual experience on such devices undesirable.

For example, many of the techniques reconstruct a missing line by interpolating using the pixels above and below the missing line. For instance, an interpolated pixel, i.e., a pixel in an interpolated line, is generated using an average of the field pixel positioned immediately above and the actual field pixel positioned immediately below the interpolated pixel. Generally, the new pixel lines, or interpolated lines, are composed of pixels with an image consistency equal to an average value of pixel samples. This technique works well if the interpolated pixel is part of a video image feature forming a line (also referred to as an edge) of an image, which is either vertical, such as a telephone pole, or horizontal, such as the top of a wall.

However, if the line of an image is on a diagonal, then the aforementioned interpolation technique likely will produce artifacts, especially if there is motion associated with the image. As used herein, artifacts generally refer to visual distortions introduced into the image. For example, suppose the image involves a recording of a hockey game and the diagonal line is part of a hockey stick held at a diagonal angle, as is common. If the aforementioned interpolation techniques were used for deinterlacing an interlaced video of the hockey game, the hockey stick may appear to be blurred or jagged when the resulting progressive format is viewed.

Attempts have been made to improve these interpolation techniques by determining the slope, also referred to as a direction, for a diagonal line of a video image when converting from the interlaced format to the progressive format. Unfortunately, these techniques have a tendency to incorrectly determine the direction for displaying the diagonal line. Consequently, the resulting video image when viewed in a progressive format often includes undesired artifacts associated with the diagonal line.

There are other techniques that borrow from weaving and interpolation techniques, including combing the two using motion detection. Most, if not all these techniques utilize expensive equipment and tend to produce images that have visual artifacts that are noticeable to users. Thus, prior art techniques for minimizing visual artifacts when converting a video stream from an interlaced format to a progressive format have been unable to completely eliminate the visual artifacts caused by deinterlacing.

SUMMARY

According to the principles of the invention, a deinterlacer incorporates a slope protection system that determines a direction, i.e., a slope, for a diagonal line along an edge, i.e., boundary, of an image more accurately than prior art slope determining systems, thereby reducing the probability of introducing artifacts when converting a video image from an interlaced format to progressive format. More specifically, the slope protection system determines the direction for a diagonal line along the edge of an image at a pixel-to-be-interpolated position, referred to as a "missing pixel," on a missing alternate line of a field when performing an intra-field interpolation, rather than simply relying on an average value of pixels above and below the missing pixel to arrive at the direction for the diagonal line as performed in prior art interpolation techniques. The slope protection system determines the direction for the diagonal line at the missing pixel by performing a slope protection operation in conjunction with converting a video stream from an interlaced format to a progressive format.

As used herein, a slope protection operation refers to performing one or more of the following operations: (i) using derivative values in conjunction with selecting a value for the slope of the diagonal line at a missing pixel on a missing line of field; (ii) using an admissibility filter to eliminate potential values for the slope that have interpolated values that are not between values for a pixel above and a pixel below the missing pixel; and (iii) using a spatial filter to refine a tentative value selected for the slope based on results obtained from performing operations described in items (i) and/or (ii), to arrive at a value for the slope of the diagonal line at the missing pixel forming a portion of the image.

One of the derivative values described above may be determined by: calculating an interpolated value for a missing pixel in one of a plurality of different directions; determining a first vertical difference value between the interpolated value and a value for a pixel above the interpolated value; determining a second vertical difference value between the interpolated value and a value for a pixel below the interpolated value; and selecting a lesser of the first and second vertical difference values to represent one of the derivative values.

Using the admissibility filter may involve: determining difference values between pixels above and below the missing pixel in a plurality of different directions; determining derivative values for the missing pixel in the plurality of different directions; determining modified difference values by adding the difference values to the plurality of derivative values in each of the different directions; selecting a minimum modified difference value out of the modified difference values; and assigning a tentative slope value indicating a direction corresponding to the minimum modified value associated with a tentative value for the slope of the diagonal line at the missing pixel.

Using the spatial filter may involve applying the minimum modified value to a spatial filter. In other words, a direction j associated with the minimum modified value represents a tentative direction for the slope of the edge in the vicinity of the missing pixel. This is applied to a spatial filter to arrive at the direction for the slope of the diagonal line at the missing pixel.

The invention may be implemented by a processor-based system that obtains an interlaced video stream, deinterlaces it using, among other techniques, a slope protection operation for diagonal lines, and supplies a progressive format version of the video signal as an output.

BRIEF DESCRIPTION OF THE DRAWINGS

The detailed description is described with reference to the accompanying figures. In the figures, the left-most digit(s) of a reference number identifies the figure in which the reference number first appears.

DETAILED DESCRIPTION

Exemplary Apparatus and Environment

Figure 1:
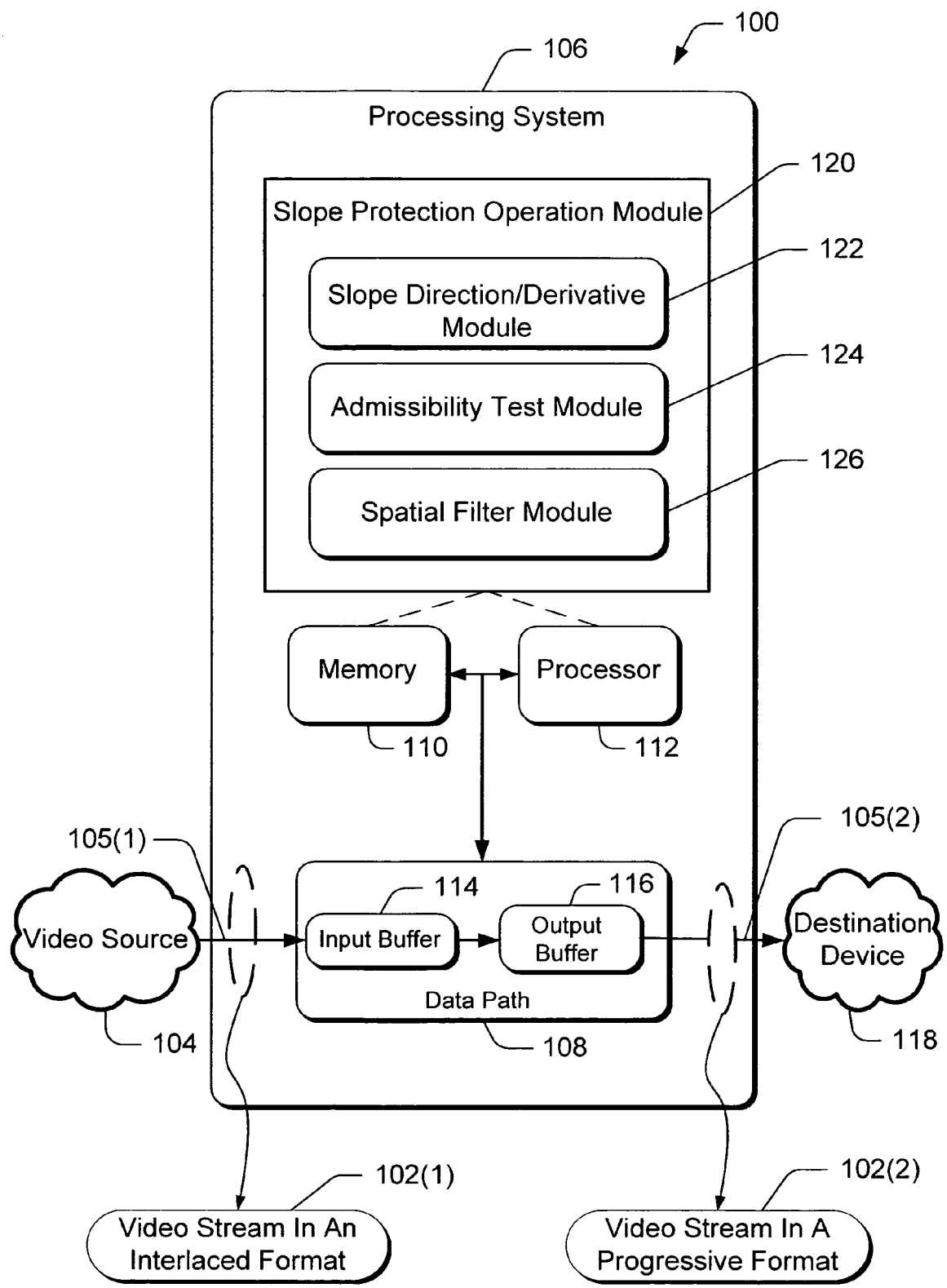
FIG. 1 illustrates various components of an exemplary apparatus suitable for deinterlacing an interlaced video stream.

FIG. 1 illustrates various components of an exemplary apparatus 100 suitable for deinterlacing an interlaced video stream. Apparatus 100 represents any device capable of deinterlacing video images, such as a video digital processing system, a deinterlacer, a general purpose computer, a set-top box, a camcorder, a digital video recorder (DVR) and playback system, a personal video recorder (PVR) and playback system, and any other type of client device that may be implemented in a television-based entertainment system, a gaming system, a multimedia system, the combination of any of the above example devices, and other smart devices capable of deinterlacing a video stream.

Apparatus 100 typically receives a video stream 102(1) from a video source 104 via communication link 105(1). Video stream 102(1) includes video images formatted in an interlaced format. Apparatus 100 converts video stream 102(1) from an interlaced format into a progressive format. That is, video stream 102(2) includes video images formatted in a progressive format. Once converted to progressive format, video stream 102(2) may be transmitted to a destination device 118 via communication link 105(2).

Video source 104 represents any type of local or remote component(s), such as memory, that may or may not be integrated (e.g., reside) as part of apparatus 100. Video source 104 may also represent any type of broadcast center(s) in which a video stream 102(1) is transmitted to apparatus 100 via communication link 105(1).

Destination device 118 represents any type of local or remote component(s) capable of receiving video stream 102(2), such as a display device, monitor, memory device, a broadcast transmission device, etc. Destination device 118 may be integrated within apparatus 100.

Communication links, referred to generally by reference number 105, represent various transmission media such as a bus, optical fiber, a conventional telephone line, a DSL connection, a cable, and/or transmission media such as satellite transmission, radio frequency transmission, and/or via any number of other various transmission media.

Apparatus 100 includes a processing system 106 configured to deinterlace video stream 102(1) from an interlaced format to a video stream 102(2) in a progressive format. In one implementation, processing system 106 includes a data path 108, memory 110, and a processor 112. Processing system 106 may include one or more of any of the aforementioned elements.

Data path 108 handles the flow of data from the time the video stream, referred to generally as reference number 102, is received from video source 104 until it is converted to a progressive format and is ready for display. Data path 108 includes an input buffer 114 and an output buffer 116. Input buffer 114 and output buffer 116 represent any type of non-volatile or volatile memory device capable of temporarily storing video images in the form of video stream 102. For instance, input buffer 114 and output buffer 116 can be implemented as one or more registers, latches, buffers, or queues. Input buffer 114 is generally used to synchronize the flow of data from video source 104 to processing system 106. Output buffer 116 is generally used to synchronize the flow of data transmitted from processing system 106 to destination device 118 via communication link 105(2).

Although not shown, data path 108 may also include other memory devices that may be used by processing system 106 to store and manipulate data. Additionally, although input buffer 114 and output buffer 116 are illustrated as being external to processor 112, they may also reside within processor 112. Furthermore, input buffer 114 and output buffer 116 may be arranged in various configurations that may include several data storage components.

Processor 112 processes various instructions or programmable logic from memory 110 to control the operation of processing system 106 and to communicate with other electronic, mechanical, and computing devices. Functionality of processor 112 may be achieved through hardware-based components, programmable logic, or processor-executable instructions in the form of hard-coded logic and/or soft-coded instructions stored in memory 110. Generally, processor-executable instructions include instructions, routines, programs, objects, components, data structures, logic, circuits, state-machines, firmware, software, and the like that perform particular functions or implement particular abstract data types.

Processor 112 represents a broad range of general purpose or special purpose processor configurations, including, but not limited to: a self-executing special-purpose programmable logic array in the form of a FPGA (Field Programmable Gate Array); one or more ASICs (Application Specific Integrated Circuit); a state-machine; a DSP (Digital Signal Processor); microprocessor; or other processor-based technology including hybrid circuit and programmable logic technologies.

Memory 110 represents a data or logic storage media in the form of non-volatile memory and/or volatile memory, examples of which include, but are not limited to: flash memory; CD-ROM, DVD (digital versatile disks); other optical storage; RAM (random access memories); ROM (read only memories); EEPROM (electrically erasable programmable read-only memory) and the like; programmable logic; FPGAs; etc. In one implementation, memory 110 may store various information, instructions and/or data to enable processor 112 to deinterlace an interlaced video stream.

Although memory 110 is illustrated as residing outside processor 112, one or more portions of memory 110 may be part of processor 112. Additionally, one or more portions of memory 110 may be part of data path 108.

As described above, processor system 106 is generally configured to convert a video stream 102(1) from an interlaced format to a progressive format 102(2). In one implementation, this is accomplished by using an apparatus and techniques described in a co-pending U.S. Non-provisional patent application entitled *Method and Apparatus for De-Interlacing Video Images* identified by Ser. No. 2002/0027610A1, filed Jan. 16, 2001, which is hereby incorporated by reference in its entirety. Alternatively, processing system 106 is intended to represent other past, current, or future apparatus(es) and/or technique(s) configured to deinterlace an interlaced formatted video stream into a progressive formatted video stream.

In either of the implementations, processor system 106 is adapted to incorporate a slope protection operation module 120, which enables processing system 106 to perform a slope protection operation in conjunction with converting a video stream 102(1) from an interlaced format to a video stream 102(2) in a progressive format. As a result of using a slope protection module 120, processor system 106 is able accurately perform slope detection with reduced probability of introducing artifacts in association with diagonal lines (also referred to as an edge of an image) displayed in a video image. As used herein diagonal lines means lines that have a slope or angle other are not perfectly horizontal or perpendicular (such as having an angle of zero or 90 degrees).

Slope protection operation module 120 may reside in processor 112 in the form of programmable logic, firmware, hardware-derived circuitry, and other various configurations as described above. For example, in one implementation, slope protection operation 120 is implemented in the form of programmable logic residing in programmable logic array chip. Alternatively, one or more portions of slope protection operation module 120 may reside in memory 110, in the form of processor-executable instructions accessible by or residing within processor 112.

As used herein, "processor-executable instructions" embody instructions, logic, data structures, program modules, or data that is accessible and readable by a processor 112. Processor-executable instructions may be stored on or transmitted across some form of processor-readable media. "Processor-readable media" can be any available media that can be accessed by a processor. Processor readable media includes volatile and non-volatile, removable and non-removable media implemented in any method or technology for storage of information such as processor readable instructions, logic, data structures, program modules, other data, etc.

Protection operation module 120 can include several sub-modules each associated with performing functionality associated with determining the slope of a diagonal line intersecting a missing pixel on a missing line of a field when converting a video stream from an interlaced format to a progressive format. In particular, each of the sub-modules perform one or more slope protection operations that enhance the ability of a video processor system to determine the slope (direction) of the diagonal line at a missing pixel.

As used herein, a slope protection operation refers to performing one or more of the following operations: (i) using derivative values in conjunction with selecting a value for the slope of the diagonal line at a missing pixel on a missing line of field; (ii) using an admissibility filter to eliminate potential values for the slope that have interpolated values that are not between values for a pixel above and a pixel below the missing pixel; and (iii) using a spatial filter to refine a tentative value selected for the slope based on results obtained from performing operations described in items (i) and/or (ii), to arrive at a value for the slope of the diagonal line at the missing pixel forming a portion of the image. Each of the operations is described in more detail below.

In one implementation, the aforementioned sub-modules include a slope direction/derivative module 122, an admissibility test module 124, and a spatial filter module 126. Slope direction/derivative module 122 enables processing system 106 to use derivative values when selecting a value for the slope of a line (e.g., a diagonal line) forming the edge of an image at a missing pixel located on a missing line of a field. Admissibility test module 124 acts as an admissibility filter to eliminate one or more potential values (such as determined by the slope direction/derivative module 122) for the slope of the line at the missing pixel that have angles, which are inconsistent with luma values of non-missing pixels for the line above and below the missing pixel. Spatial filter module 126 utilizes a spatial filter to refine a tentative value selected for the slope as determined by direction/derivative module 122 and/or admissibility test module 124, to arrive at the calculated value for the slope of the diagonal line at the missing pixel.

It should be appreciated that protection operation module 120, and sub-modules (e.g., slope direction/derivative module 122, admissibility test module 124, and spatial filter module 126) represent general functional capability performed by processor system 106 that may be performed as a single contiguous process. Additionally, processor system 106 may only include one or more portions of the protection operation module 120 and/or one or more portions of the sub-modules.

Having introduced various components of exemplary apparatus 100 suitable for deinterlacing an interlaced video stream, it is now possible to describe how processing system 106 performs one or more of the slope protection operations in more detail.

Methods of Operation

Methods for processing system 106 may be described in the general context of processor-executable instructions. The described methods may also be practiced in distributed computing environments where functions are performed by remote processing devices that are linked through a communications network. In a distributed computing environment, processor-executable instructions may be located in both local and remote storage media, including memory storage devices.

Figure 2:
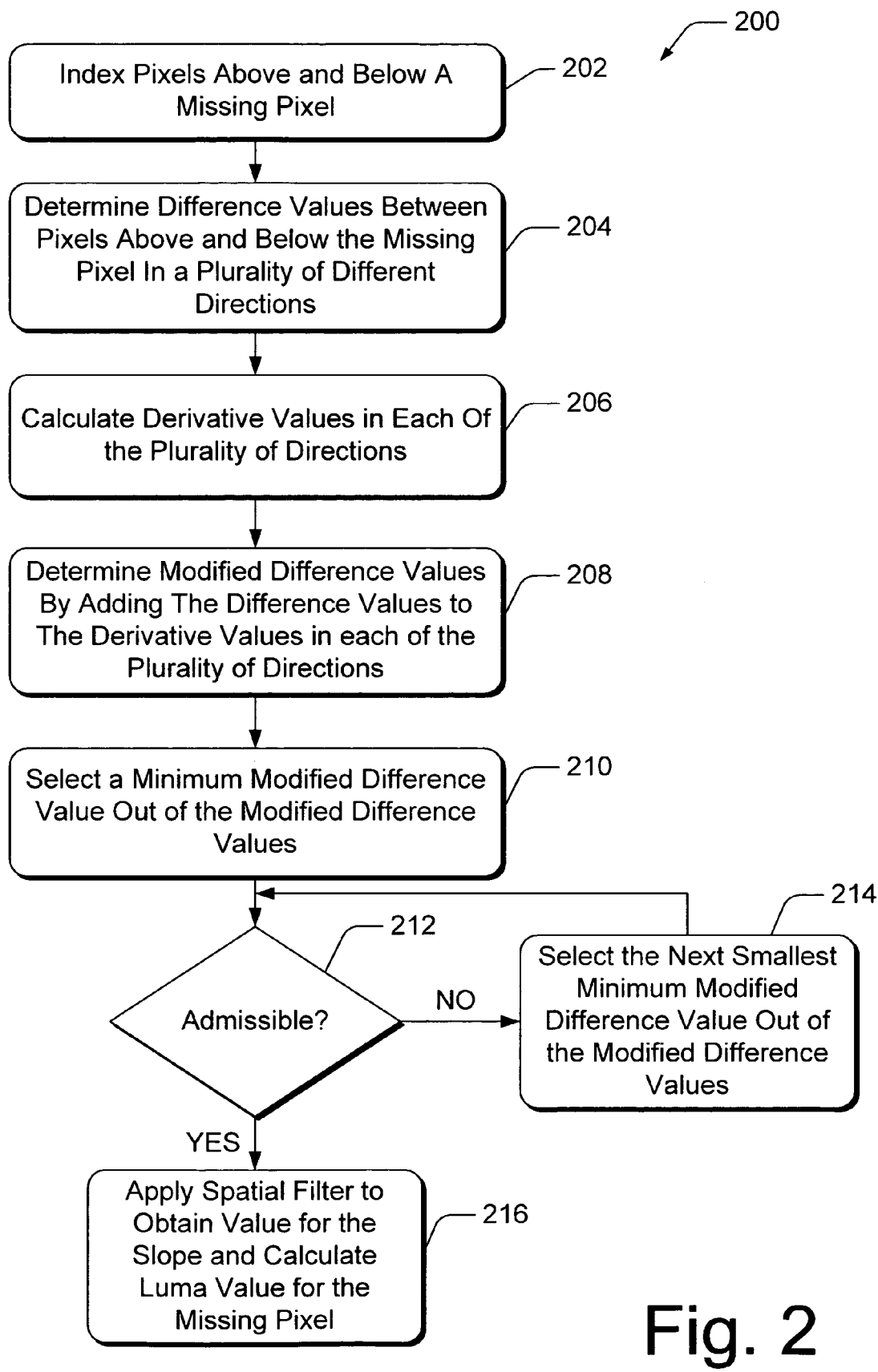
FIG. 2 illustrates an exemplary method for determining the slope of a missing pixel on a missing line of a field in an interlaced format.

FIG. 2 illustrates an exemplary method 200 for determining the slope of a missing pixel on a missing line of a field in an interlaced format. Method 200 includes blocks 202, 204, 206, 208, 210, 212, 214, and 216. The order in which the method is described is not intended to be construed as a limitation, and any number of the described method blocks can be combined in any order to implement the method. Furthermore, the method can be implemented in any suitable hardware, software, firmware, or combination thereof.

Figure 3:
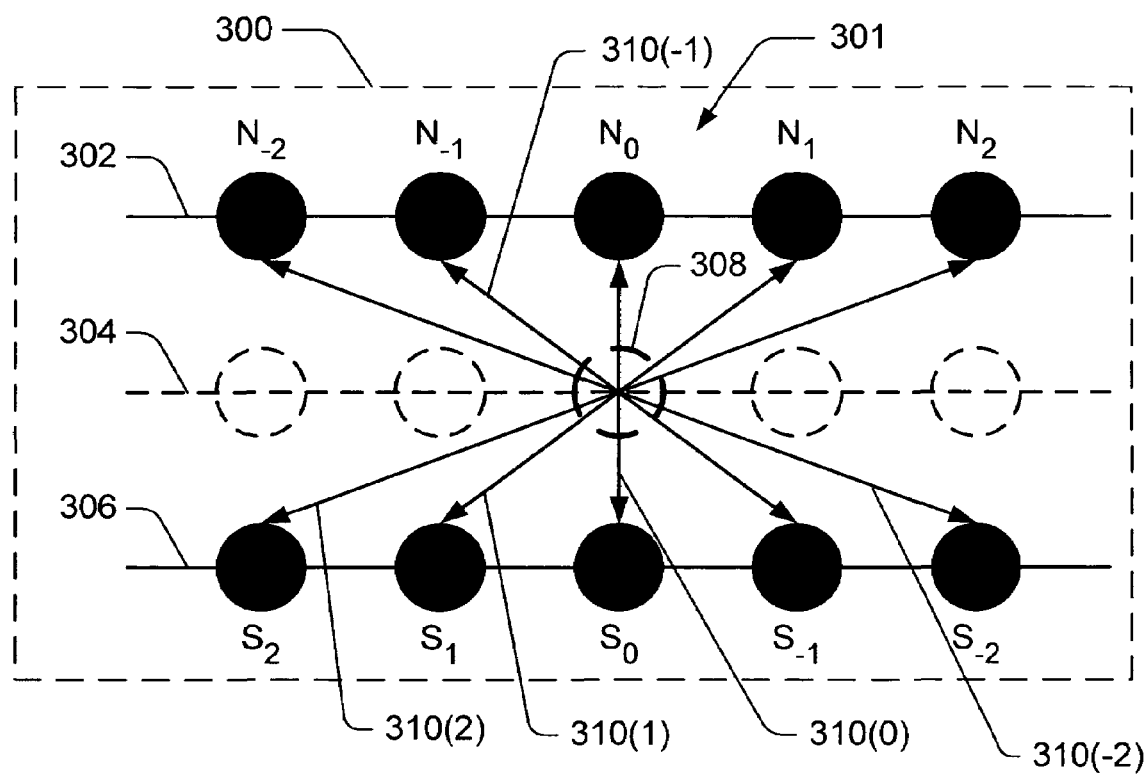
FIG. 3 shows a portion of a field from a video stream received in an interlaced format.

Exemplary method 200 shall be described interchangeably with reference to FIG. 3, which shows a portion of a field 300 from a video stream received in an interlaced format. In particular, the portion of field 300 shows a non-missing line 302, a missing line 304, and a non-missing line 306. A missing pixel 308 (i.e., a luma value for a pixel to-be-interpolated) is shown on missing line 304 for which processing system 106 (FIG. 1) is configured to determine a slope of a diagonal line that intersects the missing pixel 308. In other words, one of several potential diagonal lines (referred to generally as reference number 310) intersect missing pixel 308 in several different directions having angles ranging from zero to three-hundred-sixty degrees. Processing system 106 is configured to select a particular one out of several potential directions, to represent the slope of a diagonal line 310 at missing pixel 308 by performing slope protection operations in conjunction with deinterlacing a video image. In one exemplary implementation, functionality described in blocks 202, 204, 206, 208, 210, 212, 214, and/or 216 represent one or more slope protection operations performed by the slope protection operation module 120.

In a block 202, pixels above and below the missing pixel are indexed. For example, for each luma value, N (for pixels above missing pixel 308), and for each luma value, S (for pixels below missing pixel 308), processing system 106, assigns an index, which corresponds to potential directions (i.e., slopes or angles) for missing pixel 308. In the exemplary illustration of FIG. 3, $N_{-2}$, $N_{-1}$, $N_0$, $N_1$, $N_2$, represent indexed luma values for pixels above missing pixel 308, and $S_2$, $S_1$, $S_0$, $S_{-1}$, $S_{-2}$ represent indexed luma value for pixels below missing pixel 308. A particular luma value above missing pixel 308 may be referred to generally as $N_j$ or $S_j$ where j indicates a direction (i.e., angle or slope) of pixel above or below missing pixel 208, associated with a diagonal line 310.

In one implementation, typically five consecutive luma values for pixels to the right and left of luma values $N_0$ and $S_0$ are indexed for a total of eleven pixels above and below the missing pixel. In other implementations, other quantities of luma values may be considered to the right and/or left of the pixels, which are directly above and below the missing pixel.

In block 204, difference values between pixels above and below the missing pixel are determined in a plurality of different directions. The difference values may be expressed as $X_j=|N_j-S_j|$. For example, slope direction/derivative module 122 (FIG. 1) determines difference values Xj between corresponding pixels above and below missing pixel 308. Other processing systems or modules could be used to determine difference values.

In block 206, derivative values in each of the plurality of directions are determined. Each of the derivative values is determined by calculating an interpolated value for the missing pixel in one of the plurality of different directions, which can be expressed as $I_j=(N_j+S_j)/2$. Then a first vertical difference value between the interpolated value and a value for a pixel above the interpolated value is calculated, which can be expressed as $|N_0-I_j|$. Then a second vertical difference value between the interpolated value and a value for a pixel below the interpolated value is calculated, which can be expressed as $|S_0-I_j|$. Then a minimum value out of the first or second vertical difference value is selected to represent the derivative value, which is expressed as Min.($|N_0-I_j|$, $|S_0-I_j|$). In one exemplary implementation, slope direction/derivative module 122 (FIG. 1) determines derivative values, however, other processing systems or modules could be used to calculate a derivative value.

In block 208, modified difference values are determined in a plurality of different directions by adding the difference values, $X_j$, to corresponding derivative values [Min.($|N_0-I_j|$, $|S_0 -I_j|)]$. A modified difference value may be expressed as $D_j=X_j+[Min.(|N_0 -I_j|, |S_0-I_j|)]$. In one exemplary implementation, slope direction/derivative module 122 (FIG. 1) determines a modified difference value, however, other processing systems or modules could be used to calculate a modified difference value.

In block 210, a minimum modified difference value Dj is selected out of the modified difference values in the plurality of different directions. In one exemplary implementation, slope direction/derivative module 122 (FIG. 1) selects the modified difference value, however, other processing systems or modules could be used to select the modified difference value.

In decisional block 212, a determination is made whether the modified difference value is admissible. This is accomplished by determining whether the modified difference value $D_j$ is greater than pixel values above and below the missing pixel. For example, in one implementation, $D_j$ is considered admissible if either $N_0 \leq I_j \leq S_0$, or $S_0 \leq I_j \leq N_0$, which means that either both $N_0$ and $I_j$ or both $S_0$ and $I_j$ are inside the trace of the line whose slope is being determined. Admissibility test module 124 determines whether the modified difference value $D_j$ is admissible. In other implementations, other processing systems or modules could be used to determine whether the modified difference value $D_j$ is admissible.

If the particular modified difference value $D_j$ has a corresponding interpolated value that is not in between a particular pixel value above and a particular pixel value below the missing pixel, then according to the NO branch of decisional block 212, process 200 proceeds to block 214. In block 214 the modified difference value $D_j$ selected from block 210 is eliminated, and the next smallest minimum modified difference value out of the modified difference values is selected for admissibility testing in accordance with decisional block 212.

Figure 4:
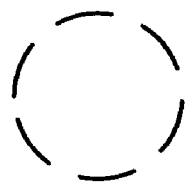
FIG. 4 illustrates a conceptual view of a nine point median filter that may be applied to the tentative direction (i.e., tentative slope value) to arrive at a value, k, for the slope of a diagonal line at a missing pixel.
Figure 4:
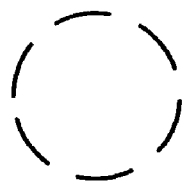
Figure 4:
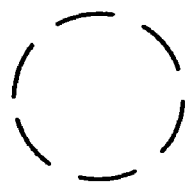
Figure 4:
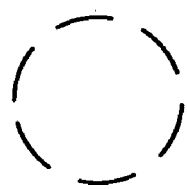
Figure 4:
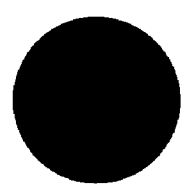
Figure 4:
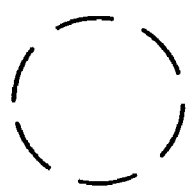
Figure 4:
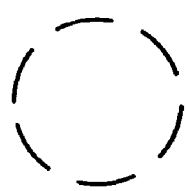
Figure 4:
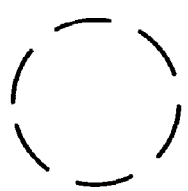
Figure 4:
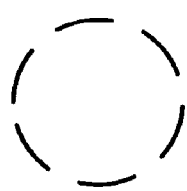

Admissibility testing is repeated until an admissible minimum modified difference value, $D_j$, is selected from block 210 according to the YES branch of decisional block 212. In block 216, the modified difference value selected from block 210, is then applied to a spatial filter to obtain a value for the slope of the diagonal line 310 at missing pixel 308. In other words, a direction j associated with the minimum modified difference value represents a tentative direction for the slope of the diagonal line 310 at the missing pixel, which is applied to a spatial filter to arrive at the direction for the slope of the diagonal line at the missing pixel. In one exemplary implementation, a nine point median filter is employed to obtain the slope for the diagonal 310. For example, FIG. 4 illustrates a nine point median filter that may be applied to the tentative direction (i.e., tentative slope value) to arrive at a value, k, for the slope of the missing line at the missing pixel. In other implementations, other types of spatial filters could be substituted for the nine-point median shown in FIG. 4.

Once the value k representing the direction (slope) for the diagonal line 310 at the missing pixel is determined, the luma value, $I_k$, for missing pixel 308 may be approximated by the following equation, $I_k=(N_k+S_k)/2$. In one exemplary implementation, spatial filter module 126 (FIG. 1) performs the slope protection operation(s), described in block 216, however, other processing systems or modules could be used to obtain a slope and luma value for the missing pixel 308.

It is again noted that many of the operations performed in process 200 may be performed in a different order. For example, it is appreciated that the admissibility test described with reference to decisional block 212 could be performed earlier or later in process 200. For instance, the admissibility test could be performed after block 208 to eliminate any $D_j$ values that do not meet the admissibility test described above, namely whether for the particular modified difference value, $D_j$, has an interpolated value, $I_j$ for the particular direction, j, greater or smaller than both $N_0$ and $S_0$. It is also appreciated that one or more of the slope protection operations may be eliminated. For instance, it is possible to eliminate admissibility testing as described with reference to decisional block 212, however, there is a risk that the minimum modified difference value selected from block 210 may correspond to a bogus direction for the slope if the admissibility test is not performed. It may also be possible to eliminate performing other slope protection operations such as operations described with reference to block 216, however, with less precision.

The foregoing merely illustrates principles of the invention. It will thus be appreciated that those skilled in the art will be able to devise various arrangements which, although not explicitly described or shown herein, embody the principles of the invention and thus within its spirit and scope.

What is claimed is:

1. An apparatus for deinterlacing a video image, comprising:
   an input buffer, configured to receive a video stream in an interlaced format, wherein the video stream comprises a field comprising a plurality of lines each line comprising a plurality of pixels; and
   a processor configured to convert the video stream from the interlaced format to a progressive format by inserting a luma value into the video stream at the position of a pixel to-be-interpolated which is located in between the lines of the field, the processor including a slope protection operation module adapted to determine the slope of a diagonal line of an image intersecting the pixel to-be-interpolated by performing a slope protection opertation comprising determining derivative values in conjunction with selecting a value for the slope of the diagonal line at the position at the pixel to-be-interpolated.

2. The apparatus as recited in claim 1, further comprising an output buffer configured to transmit the video stream in the progressive format.

3. The apparatus as recited in claim 1, wherein the processor is configured to determine one of the derivative values by calculating an interpolated value for the pixel to-be-interpolated in one of the plurality of different directions.

4. An apparatus for deinterlacing a video image, comprising:
   an input buffer, configured to receive a video stream in an interlaced format, wherein the video stream comprises a field comprising a plurality of lines each line comprising a plurality of pixels; and
   a processor configured to convert the video stream from the interlaced format to a progressive format by inserting a luma value into the video stream at the position of a pixel to-be-interpolated which is located in between the lines of the field, the processor including a slope protection operation module adapted to determine the slope of a diagonal line of an image intersecting the pixel to-be-interpolated by performing a slope protection operation comprising determining derivative values in conjunction with selecting a value for the slope of the diagonal line at position at the pixel to-be-interpolated, the slope protection operation module comprising an admissibility filter to eliminate potential values for the slope that have interpolated values that are not in between a pixel value above and a pixel value below the pixel to-be-interpolated.

5. An apparatus for deinterlacing a video image, comprising:
an input buffer, configured to receive a video stream in an interlaced format, wherein the video stream comprises a field comprising a plurality of lines each line comprising a plurality of pixels; and
a processor configured to convert the video stream from the interlaced format to a progressive format by inserting a luma value into the video stream at the position of a pixel to-be-interpolated which is located in between the lines of the field, the processor including a slope protection operation module adapted to determine the slope of a diagonal line of an image intersecting the pixel to-be-interrpolated by performing a slope protection operation, wherein the slope protection operation module comprises: (i) a slope direction/derivative module configured to determine derivative values in conjunction with selecting a value for the slope of the diagonal line at position at the pixel to-be-interpolated, (ii) an admissibility filter configured to eliminate potential values for the slope that have interpolated values that are not in between a pixel value above and a pixel value below the pixel to-be-interpolated, and (iii) a spatial filter configured to refine a tentative value selected for the slope based on results obtained from the slope direction/derivative module and/or the admissibility filter to arrive at a value for the slope the diagonal line.

6. The apparatus as recited in claim 5, wherein the slope protection operation module is configured to (i) determine difference values between pixels above and below the pixel to-be-interpolated in a plurality of different directions, (ii) determine derivative values for the pixel to-be-interpolated in the plurality of different directions, (iii) determine modified difference values by adding the difference values to the plurality of derivative values for each of the different directions, (iv) select a minimum modified difference value out of the modified difference values, and (v) assign a tentative slope value to the pixel to-be-interpolated associated with a direction corresponding to the minimum modified value.

7. The apparatus as recited in claim 5, wherein the slope protection operation module is configured to (i) determine difference values between pixels above and below the pixel to-be-interpolated in a plurality of different directions, (ii) determine derivative values for the pixel to-be-interpolated in the plurality of different directions, (iii) determine modified difference values by adding the difference values to the plurality of derivative values for each of the different directions, (iv) select a minimum modified difference value out of the modified difference values, and (v) assign a tentative slope value to the diagonal line at the pixel to-be-interpolated associated with a direction corresponding to the minimum modified value; and (vi) applying a spatial filter to the tentative slope value to obtain the slope for the diagonal line at the pixel to-be-interpolated.

8. The apparatus as recited in claim 7, wherein the processor is configured to (a) determine the derivative values by calculating an interpolated value for the pixel to-be-interpolated in one of the plurality of different directions, (b) determine a first vertical difference value between the interpolated value and a value for a pixel above the interpolated value, (c) determine a second vertical difference value between the interpolated value and a value for a pixel below the interpolated value, and (d) select a minimum value out of the first and second vertical difference values to represent one of the derivative values.

9. An apparatus for deinterlacing a video image, comprising:
an input buffer, configured to receive a video stream in an interlaced format, wherein the video stream comprises a field comprising a plurality of lines each line comprising a plurality of pixels;
a processor, configured to convert the video stream from the interlaced format to a progressive format by inserting a value for at least one missing pixel for a missing line that should exist between the lines of the field, the processor comprising a slope protection operation module configured to determine the slope of a diagonal line of an image intersecting the missing pixel by (i) determining difference values between pixels above and below the missing pixel in a plurality of different directions, (ii) determining derivative values for the missing pixel in the plurality of different directions, (iii) determining modified difference values by adding the difference values to the plurality of derivative values for each of the different directions, (iv) selecting a minimum modified difference value out of the modified diagonal difference values, (v) assigning a tentative slope value to the diagonal line at the missing pixel associated with a direction corresponding to the minimum modified value, and (vi) applying a spatial filter to the tentative slope value to obtain the slope for the diagonal line at the missing pixel; and
an output buffer configured to transmit the video stream in a progressive format.

10. The apparatus as recited in claim 9, wherein the processor is configured to: determine one of the derivative values by: (a) calculating an interpolated value for the missing pixel in one of the plurality of different directions; (b) determining a first vertical difference value between the interpolated value and a value for a pixel above the interpolated value; (c) determining a second vertical difference value between the interpolated value and a value for a pixel below the interpolated value; and (d) selecting a minimum value out of the first and second vertical difference values to represent one of the derivative values.

11. The apparatus as recited in claim 9, wherein the processor is further configured to eliminate any modified difference values for consideration that include a derivative value that is not between a pixel value above and a pixel value below the missing pixel.

12. The apparatus as recited in claim 9, wherein the processor is further configured to consider only those modified diagonal difference values that have interpolation values that meet an admissibility test for purposes of selecting the minimum modified difference value, wherein the test includes computing interpolation values for the missing pixel using pixels above and below the missing pixel in each of the plurality directions, and eliminating any modified difference values for consideration that include an interpolation that is not in between a pixel value above and a pixel value below the missing pixel.

13. A method for determining a slope for a diagonal line of an image at a first pixel position on a line of a field of a video stream, when converting the video stream from an interlaced format to a progressive format, the method comprising:
computing difference values between pixels above and below the first pixel position in different directions;
computing derivative values in each of the different directions;

computing tentative interpolation values for a pixel to be located at the first pixel position in each of the different directions;

calculating sums of the difference values and the derivative values for each of the different directions;

eliminating any particular one of the sums for which the tentative interpolation value for the first pixel corresponds to a direction not between a pixel value above and a pixel value of a pixel below the first pixel; and selecting a smallest sum from the sums not eliminated and using the direction associated with the smallest sum to represent a tentative direction for the slope of the first pixel position.

14. The method as recited in claim 13, further comprising: applying the tentative direction to a median filter to arrive at the direction for the slope of the diagonal line at the first pixel position.

15. The method as recited in claim 13, further comprising: applying the tentative direction to a median filter to arrive at the direction for the diagonal line at the missing pixel and using the direction to calculate a luma value for the first pixel position.

16. One or more processor-readable media having stored thereon processor executable instructions that, when executed by one or more processors, causes the one or more processors of a system to:

determine a slope for a diagonal line of an image at a first pixel on a line of a field of a video stream, when converting the video stream from an interlaced format to a progressive format;

compute difference values between pixels above and below the first pixel in different directions;

compute derivative values in each of the different directions;

compute tentative interpolation values for the first pixel in each of the different directions;

calculate sums of the difference values and the derivative values for each of the different directions;

eliminate any particular one of the sums for which the tentative interpolation value for the first pixel corresponds to a direction not between a pixel value above and a pixel value of a pixel below the first pixel; and select a smallest sum from the sums not eliminated and using the direction associated with the smallest sum to represent a tentative direction for the slope of the first pixel.

17. A processor system configured to convert a video stream from an interlaced format to a progressive format by inserting at least one missing pixel on a missing line between the lines of the field, the processor system, comprising:

a slope direction and derivative module configured to (i) determine difference values between pixels above and below the missing pixel in a plurality of different directions, (ii) determine derivative values for the missing pixel in the plurality of different directions, (iii) determine modified difference values by adding the difference values to the plurality of derivative values for each of the different directions, (iv) select a minimum modified difference value out of the modified difference values, and (v) assign a direction corresponding to the minimum modified value associated with a slope for a diagonal line of an image intersecting the missing pixel.

18. The processor system as recited in claim 17, further comprising an output buffer configured to transmit the video stream in the progressive format.

19. The processor systems as recited in claim 17, further comprising an admissibility test module, configured to test whether at least one of the modified difference values has a corresponding associated interpolated value not in between a pixel value above and a pixel value below the missing pixel, and eliminate the at least one modified difference value for consideration in determining the slope if the associated interpolated value is not between the pixel value above and the pixel value below the missing pixel.

20. The processor system as recited in claim 17, further comprising a spatial filter module, configured to apply the tentative slope value associated with a direction corresponding to the minimum modified value to the median filter to arrive at the direction for the diagonal line at the missing pixel.

21. The processor system as recited in claim 17, further comprising an input buffer, configured to receive a video stream in an interlaced format.

22. A system for determining a slope for a diagonal line of an image at a first pixel position on a line being generated for a field of a video stream when converting the video stream from an interlaced format to a progressive format, the system comprising:

means for determining difference values between pixels above and below the first pixel position in a plurality of different directions;

means for determining derivative values for the first pixel position in the plurality of different directions;

means for determining modified difference values by adding the difference values to the plurality of derivative values for each of the different directions;

means for selecting a minimum modified difference value out of the modified diagonal difference values;

means for assigning a tentative slope value to the first pixel position associated with a direction corresponding to the minimum modified value; and means for applying a spatial filter to the tentative slope value to obtain the slope for diagonal line at the first pixel position.

* * * * *